April 19, 1927.
E. A. ULMANN
1,625,000
CONTROLLING APPARATUS
Filed Aug. 20, 1923
2 Sheets-Sheet 2
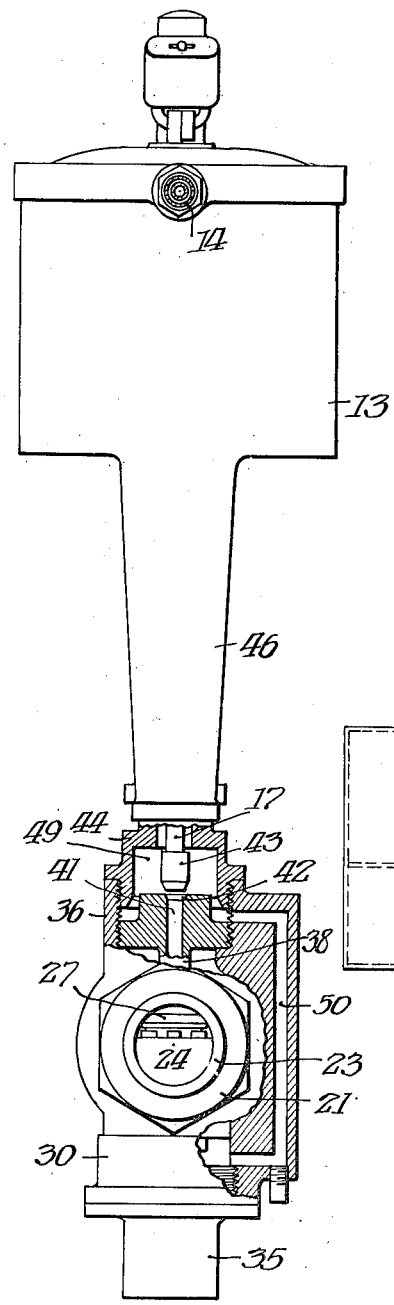
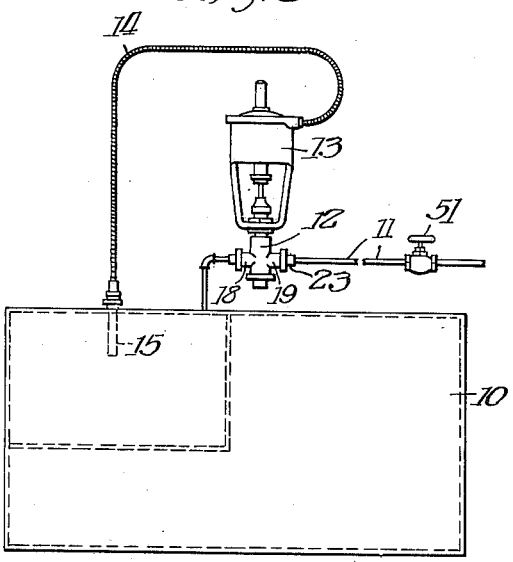
Inventor:
Edgar H. Ulmann,
By Fisher, Foule, Clapp & Soans,
Attys.

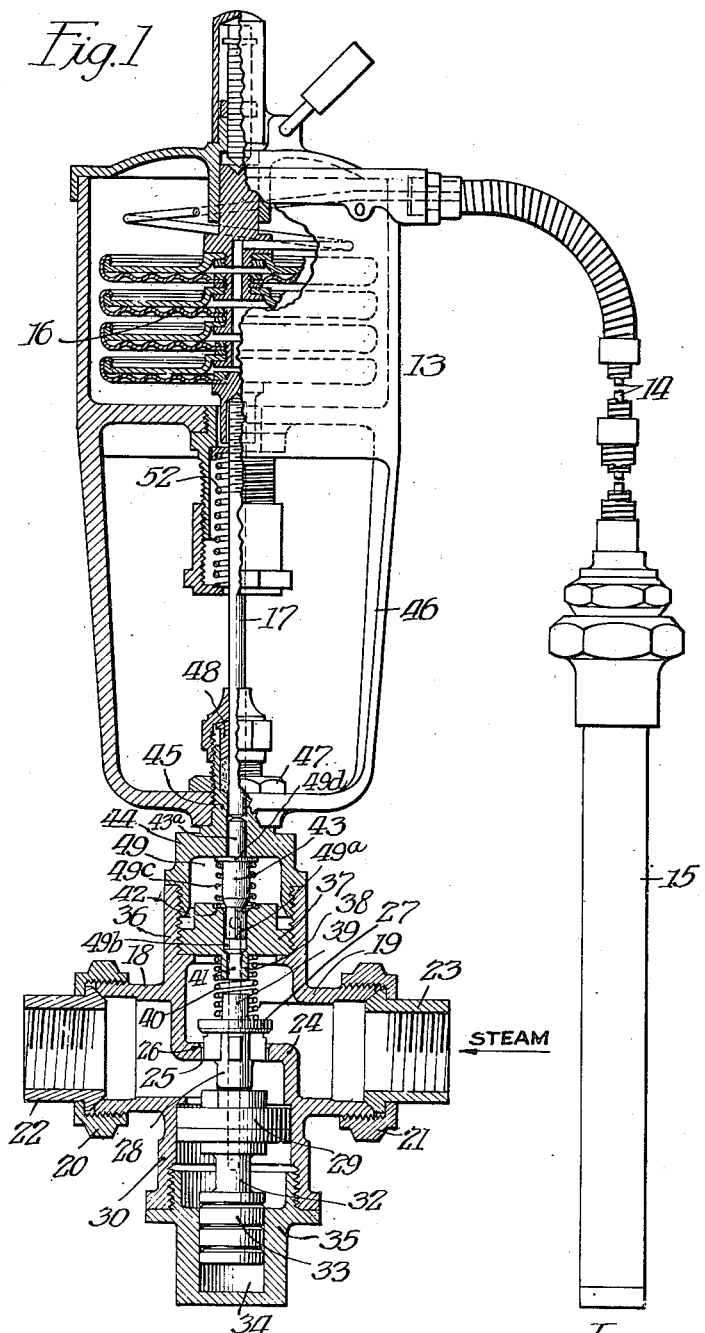

Patented Apr. 19, 1927.

1,625,000

UNITED STATES PATENT OFFICE.

EDGAR A. ULMANN, OF LOS ANGELES, CALIFORNIA, ASSIGNOR, BY MESNE ASSIGNMENTS, TO TOWER MANUFACTURING CO. INC., OF NEW YORK, N. Y., A CORPORATION OF NEW YORK.

CONTROLLING APPARATUS.

Application filed August 20, 1923. Serial No. 658,233.

My invention relates to improvements in controlling apparatus, and, although capable of different applications, is particularly well adapted for the automatic regulation and control of temperature or pressure in treating chambers, for example, vulcanizers.

In the United States Patent issued to Albin J. Nelson, No. 1,439,750, dated Dec. 26, 1922, there is described a controlling apparatus which includes a bulb insertable in the treating chamber, which bulb contains a supply of ether or other volatile fluid and is connected to a diaphragm motor actuating directly, that is to say, by means of its own power, a main valve located in the conduit by which pressure or heating fluid is conducted into the chamber. Such apparatus is quite successful, but by reason of the direct action of the diaphragm motor upon the valve, the diaphragm motor must necessarily expand or contract through a considerable range of movement in order to close or fully open the main valve which it actuates. Hence such an apparatus, which in the trade is known as an "airless controller" is inherently less sensitive than one in which the diaphragm motor merely opens and closes a connection controlling a source of power through which the main supply valve is operated. However, the so-called airless type of controller, by reason of its not requiring an auxiliary apparatus or other source of secondary power, for example, compressed air, other than what is contained in the bulb, is comparatively simple and does not require as much attention or adjustment as one of the more complicated and more sensitive air controllers.

The principal object of the present invention is to provide, in connection with a direct action control apparatus, means operated by the pressure of the fluid supply for actuating the main valve by which the supply of such fluid to the treating chamber is regulated or controlled; to provide a system and construction of the class described which shall be extremely sensitive and responsive to slight changes of temperature or pressure in the treating chamber; to provide a system and apparatus which is simple in design and to manufacture, rugged and reliable in operation, while being inexpensive and convenient to maintain in operation, and in general to provide an improved system and apparatus of the character referred to.

In the drawings which illustrate the invention as applied to an apparatus for regulating the temperature or pressure of steam in a vulcanizing chamber, Fig. 1 is a vertical section taken through my improved controlling apparatus.

Fig. 2 is a side elevation of the same shown partly in section, and

Fig. 3 is a diagrammatic view showing the general arrangement of the apparatus.

In the drawings, 10 represents a tank or chamber, for example, a vulcanizer into which steam is supplied through a conduit 11. In said conduit 11, there is interposed a controlling valve mechanism designated as a whole at 12, which valve 12 is automatically regulated or actuated by means of the diaphragm motor or airless controller 13. As in said Nelson Patent No. 1,439,750, the diaphragm motor or capsule is connected by means of a small bore tube 14 to the bulb 15 containing the usual volatile fluid which, in its expansion or contraction, actuates the bellows capsule 16. Also, as in said Nelson patent, when the temperature or pressure in the chamber 10 has been raised beyond a certain predetermined amount for which the apparatus is organized or adjusted, the actuating rod 17 will be operatively connected to the motor capsule.

In the embodiment shown, the housing which contains both the main valve and its actuating apparatus comprises a pair of aligned nipples 18 and 19 connected respectively by unions 20 and 21 to the pipe 22 leading into the tank or chamber 10 and the pipe 23 which is connected to the supply pipe 11. Intermediate the nipples 18 and 19 of the valve housing, there is formed a partition 24 through which is drilled or cast a port or opening 25, the upper end of said opening 25 constituting a valve seat 26. With said valve seat 26 there cooperates a mushroom valve 27, the body of which extends down through the port 25 and is formed with a lower reduced extension 28. Said extension 28 rests upon and engages the top of a piston element 29 adapted to move up or down in a cylinder 30 which is made as a lower or depending extension of the valve housing. The lower end of said piston 29 is formed with a depending extension 32 having an enlargement 33 thereon constituting a plunger piston operating in a dash pot cylinder 34 which is bored in a thimble member 35 screwed into the lower end of the cylinder 30.

On the upper end of the valve housing there is formed an integral upwardly extending nipple member 36 threaded to accommodate a plug 37, said plug having formed on its underside a reduced extension 38 aligned with an extension 39 projecting upwardly from the valve 27 and formed therewith. A coil compression spring 40 positioned on, and aligned, with extensions 38 and 39 on the plug 37 and valve 27 respectively, serves at all times to maintain the valve body extension 28 in engagement with the upper side of the piston 29 through which the valve 27 is actuated.

Through the center of the plug 37 there is drilled a vertically extending port 41, the upper end of which is formed with a valve seat 42 and with said valve seat there cooperates a pilot valve member 43. In the upper end of the top nipple 36 of the valve housing there is threaded and secured a hollow bonnet 44, said bonnet having an upper extension 45 on which the lower end of the airless controller 46 is rigidly mounted. That portion of the bonnet extension 45 which extends above the securing nut 47 is equipped with a gland or stuffing box 48 through which slides the actuating rod 17 of the motor capsule 16.

The lower end of the stem 17 does not extend all the way through the top of the bonnet 44, but only far enough through the gland 48 to conveniently engage the upper end of a stem 43ª formed with and extending coaxially upwardly from valve body 43 into the aperture drilled in the bonnet under rod 17. Preferably the stem 43ª is somewhat less in diameter than the bore in which it slides, so that there will be nothing to interfere with the proper centering of the valve body 43 on its valve seat 42. Such centering is effected by forming on the lower end of the valve body 43 a depending fluted extension 49ª fitting within an enlarged bore 49ᵇ at the upper end valve port 41. Valve body 43, when permitted by the position of stem 17, is elevated by a light coil spring 49ᶜ which engages a circumferential shoulder 49ᵈ on the upper end of valve body 43.

The interior space 49 of the valve bonnet above the plug 37 is preferably of somewhat greater volume than the displacement of the full stroke of piston 29 and is connected to the interior of cylinder 30 below piston 29 by means of a conduit 50 (see Fig. 2) drilled or cast in the body of the valve housing. The pilot valve 43 is in effect contained within said conduit, the space 49 merely constituting an enlargement thereof.

Describing the operation of the apparatus, the drawings illustrate the condition existing when the steam is turned on through valve 51. As soon as this occurs, steam will enter the nipple 19 and flow up through the pilot port 41 into space 49 through conduit 50 into cylinder 30 under piston 29, raising the latter and elevating valve 27 into the fully open position as shown in Fig. 1. Steam will thus flow into the receptacle or chamber 10.

When the steam has heated the interior of the vulcanizing chamber, and bulb 15 sufficiently, the volatile fluid contained within said bulb 15 will cause the capsule 16 to expand and, as described in the said Nelson patent, after the expansion, due to rise in temperature, has reached a certain amount, the lower end of the capsule will engage and push down the actuating rod 17 against the pressure of the relatively weak normalizing spring 52. It will be understood, however, that the initial downward movement of the actuating rod 17 has no effect upon the valve 27 for the reason that port 41 is still open.

However, when the temperature reaches the point for which the apparatus is organized or adjusted, the pilot valve 43 will engage the seat 42 and prevent further entry of steam into conduit 50. When this occurs, because of radiation and conduction of heat from the valve, the steam contained within space 49, and any steam which may be in the cylinder 30 will condense, thus permitting the pressure of steam on the upper side of piston 29 to depress the latter, permitting valve 27 to close. It may be stated that the function of the relatively light spring 40 is not primarily to close the valve 27, but is primarily to maintain the valve body 28 in engagement with piston 29, although said spring assists somewhat in the closing of the valve. The steam pressure in the supply pipe 23 is chiefly depended upon to close the valve 27.

When the temperature in the vulcanizing chamber 10 falls below the point for which the apparatus is adjusted, the capsule 16 will contract permitting the spring 52 to open pilot valve 43 slightly, thus allowing steam from supply pipe 23 again to flow through conduit 50 and raise piston 29 thus opening valve 27 and causing a further supply of steam to enter the treating chamber. It will be observed that an extremely minute movement of the pilot valve 43 is all that is necessary in order to effect opening or closing of the main control valve 27 while at the same time the capsule 16 is not called upon to perform the relatively heavy work of opening and closing said main valve 27, this being performed by the steam itself operating upon piston 29.

The described details of construction and operation are merely illustrative of a single application of my invention, the scope of which is to be determined by reference to the appended claim, said claim being construed as broadly as possible, consistent with the state of the art.

I claim as my invention:

In a heat control system the combination with a steam supply, of a valve casing interposed in the supply line having a valve seat and a main valve cooperating therewith, a separate piston member coaxial with said valve and resilient means pressing said valve and piston into engagement, a cylinder for said piston, a pilot valve and seat coaxial with said valve and piston, means connecting one side of said pilot valve to the steam supply, means connecting the other side of said pilot valve to the cylinder on the side of said piston opposite said main valve, and coaxial thermostatically operated means for actuating said pilot valve to control the pressure on said piston and operate said main valve by the steam from said supply line.

EDGAR A. ULMANN.